United States Patent [19]

Carlstrom

[11] E Patent Number: Re. 32,435

[45] Reissued Date of Patent: Jun. 9, 1987

[54] BRACKET STRUCTURE FOR SUPPORTING A SHELF OR PARTITION OF A DISPLAY CASE OR THE LIKE

[75] Inventor: William Carlstrom, Far Hills, N.J.

[73] Assignee: Lyle/Carlstrom Associates, Inc., Somerville, N.J.

[21] Appl. No.: 837,086

[22] Filed: Mar. 6, 1986

Related U.S. Patent Documents

Reissue of:

[64] Patent No.: 4,444,321
Issued: Apr. 24, 1984
Appl. No.: 378,592
Filed: May 17, 1982

[51] Int. Cl.[4] ..... A47B 47/00

[52] U.S. Cl. ..... 211/186; 24/326; 24/625; 24/590; 24/663; 248/221.4; 248/235; 248/239; 312/140; 403/407.1

[58] Field of Search ..... 248/544, 222.3, 221.4, 248/239, 73, 235; 211/186; 24/326, 625, 590, 663, 336, 341; 108/108, 109, 64; 312/140; 403/407; 411/349

[56] References Cited

U.S. PATENT DOCUMENTS

| | | | |
|---|---|---|---|
| 592,929 | 11/1897 | Exline | 24/213 CS |
| 1,978,087 | 10/1934 | Johnson | 24/453 |
| 2,114,430 | 4/1938 | Roseman | 24/663 X |
| 2,203,973 | 6/1940 | Walls | 24/221 R |
| 2,765,698 | 10/1956 | Devine | 24/221 R |
| 4,223,966 | 9/1980 | Winters | 312/140 |

FOREIGN PATENT DOCUMENTS

| | | | |
|---|---|---|---|
| 2550374 | 11/1980 | Switzerland | 312/140 |

*Primary Examiner*—J. Franklin Foss
*Assistant Examiner*—David L. Talbott
*Attorney, Agent, or Firm*—Edward H. Loveman

[57] ABSTRACT

A bracket structure for supporting a horizontal or vertical sheet-like member and adapted for attachment to a supporting apertured panel having a first U-shaped clip with two opposing spaced flat side walls joined by an integral end wall. A stem extends outwardly of the end wall which has a cylindrical slotted neck to define flexible spaced bifurcations. When the bifurcations are pressed together they define a round head which may enter an aperture in the supporting panel.

11 Claims, 14 Drawing Figures

BRACKET STRUCTURE FOR SUPPORTING A SHELF OR PARTITION OF A DISPLAY CASE OR THE LIKE

Matter enclosed in heavy brackets [ ] appears in the original patent but forms no part of this reissue specification; matter printed in italics indicates the additions made by reissue.

This invention relates to the art of shelf supporting brackets and more particularly concerns a bracket structure supporting a sheet-like member such as a horizontal shelf or a vertical partition in a display case, or the like.

It has been known heretofore to provide brackets of various types adapted for clamping a horizontal shelf or vertical partition to a stationary partition or shelf. Prior U.S. Pat. No. 4,223,966 discloses one type of U-shaped clamping clip which is mounted on the wall of a display case by means of a screw engaged in a bore in the base of the clip to support a shelf on partition.

The use of screws for shelf clips or clamps has been found objectionable for several reasons. If the screws loosen and fall out the shelf partition, or divider panel, supported thereby collapses. Installation requires manual insertion of screws and tightening of screws with a screw driver, which are slow, time consuming, operations.

The present invention is directed at a bracket structure and a bracket assembly which includes interfitting male and female clips adapted to frictionally engage and support a sheet-like member such as a shelf to an apertured panel, partition, divider, etc. The male clip is U-shaped structure with an end wall and a stem extended therefrom. The stem has a cylindrical neck and bifurcations, each of which has a tip with a substantially larger radius than the radius of the cylindrical neck. The tips may be beveled to facilitate insertion thereof in a partition, divider, etc. The female clip is also U-shaped with an end wall or bight in which is a central hole through which the tips of the stem of the male clip may be inserted after they have passed through a aperture in a partition or divider, etc. Since the tips are beveled, they assist in compressing the flexible bifurcations of the stem as they are passed through the aligned holes in the mounting panel and the female clip. After the tips pass through the hole in the female clip the bifurcations expand and lock the stem and partition to the female clip. The clips may be detached easily by rotating the clip 90° with respect to each other which compreses the bifurcations of the stem allowing it to pass easily through the holes in both the female clip and the mounting panel.

It is therefore a principal object of the present invention to provide a bracket comprising a U-shaped male clip for locking a shelf to an apertured panel or the like wherein the clip has an end wall with a stem extending therefrom for engagement into an aperture in the panel.

Another object of the present invention is to provide a male clip as described wherein the neck of the stem is bifurcated at one end.

Still another object of the present invention is to provide a bracket assembly including a male clip as described and a U-shaped female clip having an end wall in which is a hole arranged to receive the stem of the male clip when the respective end walls are abutted against respective sides of the panel.

A further object of the present invention is to provide a male clip as described wherein the bifurcated stem may be easily mounted and removed from the panel by only compressing the bifurcating stem.

These and other objects and many of the attendant advantages of this invention will be readily appreciated as the same becomes better understood by reference to the following detailed description when considered in connection with the accompanying drawings in which.

Figure 7:
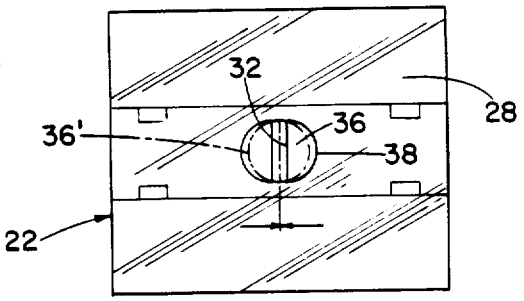
FIG. 7 is an end elevational view taken along line 7—7 of FIG. 5.
Figure 5:
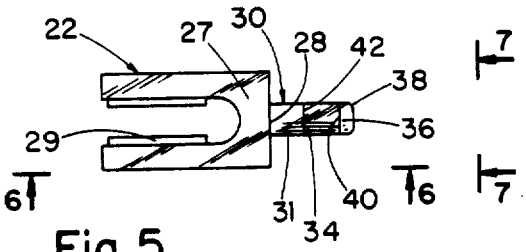
FIG. 5 is an enlarged side view of a male clip forming part of the bracket assembly.
Figure 8:
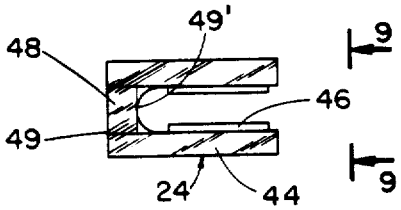
FIG. 8 is an enlarged side elevational view of a female clip forming part of the bracket assembly.
Figure 6:
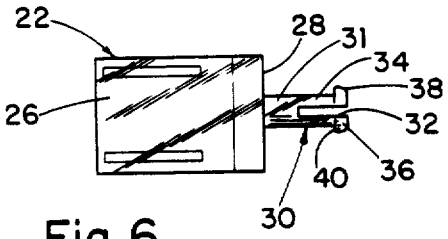
FIG. 6 is a top plan view taken along line 6—6 of FIG. 5.
Figure 9:
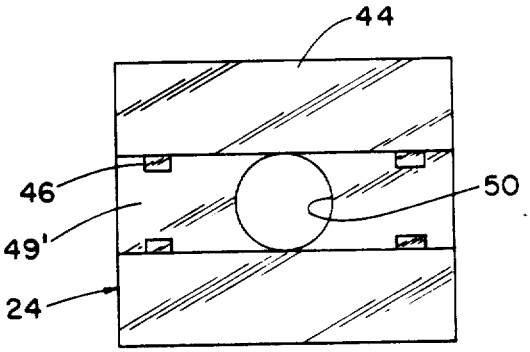
FIG. 9 is an end elevational view taken along line 9—9 of FIG. 8.

Referring now to the drawings wherein like reference character designate like or corresponding parts throughout, there is illustrated in FIGS. 1, 2, 3, 4, 10, 11, and 12, a bracket assembly generally designated as reference numeral 20 including a male clip 22 and a female clip 24. The male clip has a rectangular U-shaped structure with two flat sides or side walls 26 and a bight or end wall 27 which is flat on the outer side 28 and is curved inside. Spaced ridges or ribs 29 are formed inside the clip integral with sides 26 and extend lenthwise of the side walls 26. Extending outwardly from the center of the side 28 of the bight 27 is a stem 30 having a cylindrical neck 31 which has a diametral slot 32 extending to the outer free end of the stem 30. The slot 32 defines two spaced bifurcations 34 each of which terminates in a semicircular tip 36 which as illustrated in FIG. 6, are parallel and have the same cross-sectional area and each is larger in radius than the radius of the neck 31. The bifurcations 34 are flexible so that they may be pressed together as indicated by arrows in FIG. 7 to define a circular head 36' at the end of the stem. The outer end edge 38 of each tip 36 is beveled. The rear side of each tip 36 is formed as a flat radial annular shoulder 40; see FIGS. 5, 6, and 7. The entire clip 22 may be formed of a molded plastic material. By this arrangement, a sheet-like member such as a panel or shelf 42 may be pushed into the clip 22 between the side walls 26 where the panel 42 will be frictionally gripped and securely but detachably clamped by the ridges 29; see FIGS. 1, 2, and 3.

The female clip 24 shown in FIGS. 1–4, 8–12 is a rectangular U-shaped structure like the clip 22 and has flat spaced opposing side walls 44 formed with integral internal, longitudinal laterally spaced ridges 46 to receive and engage a flat shelf or panel 47; see FIGS. 1, 2, 3, and 10. The clip 24 has a curved inner side 49′ and end wall or bight 48 formed with an external flat side 49. Centrally located in the bight 48 is a circular hole 50 opening into the interior of the clip 24. The diameter of the hole 50 is equal to or slightly larger than the diameter of the circular head 36′ of the stem 30 defined when difurcations 34 are bend toward each other as clearly shown in FIGS. 11 and 12.

Figure 1:
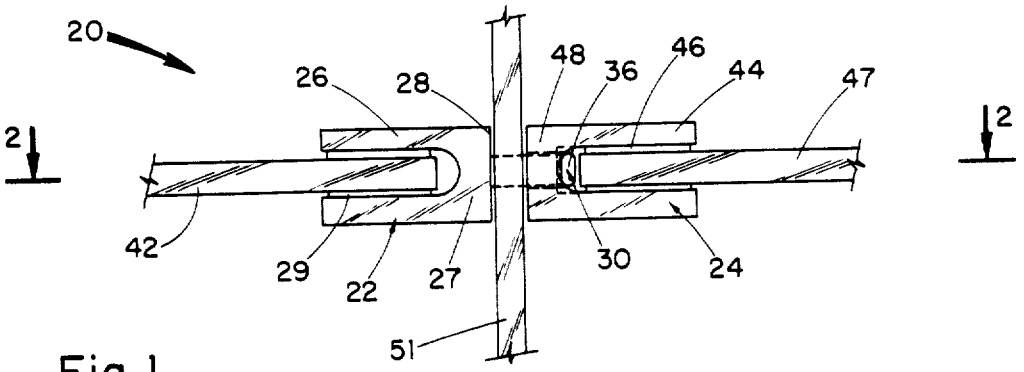
FIG. 1 is a side elevational view of a bracket assembly embodying the invention, shown with a male and female clip mounted on a panel, partition, or divider each supporting a shelf at opposite sides of the panel.
Figure 2:
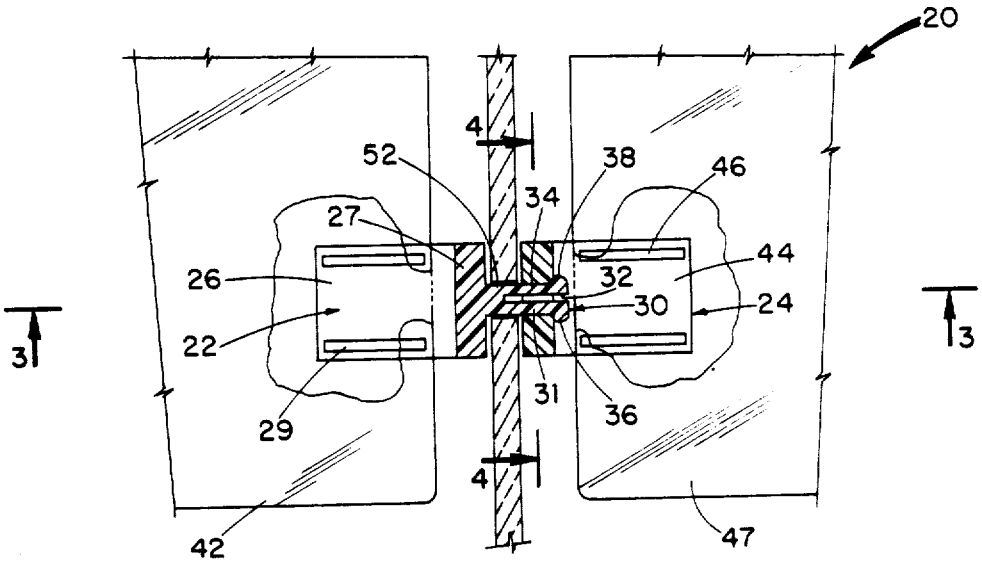
FIG. 2 is a horizontal cross sectional view taken along lines 2—2 of FIG. 1, parts of the supported shelves being broken away.
Figure 4:
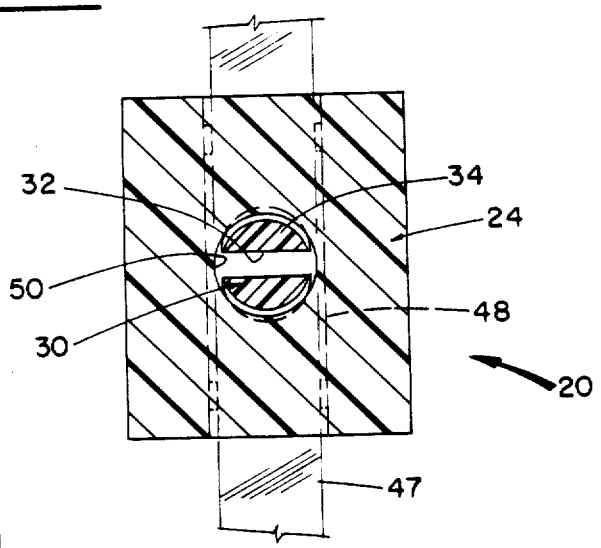
FIG. 4 is an enlarged vertical sectional view of the clip structure taken along line 4—4 of FIG. 2.
Figure 3:
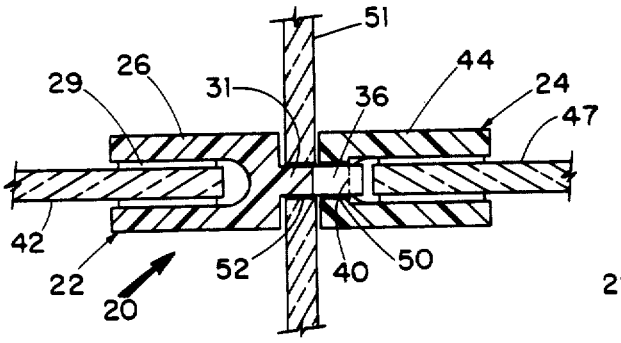
FIG. 3 is a vertical cross sectional view taken along line 3—3 of FIG. 2.

To mount the clip structure 20 on a support panel partition or divider 51 shown in FIGS. 1, 2, 3, 11, and 12, the head end 36′ of stem 30 will be pressed against the rim of a hole 52 in the panel 51. The beveled rim or edge 38 of each of the tips 36 will move in radially compressing the bifurcations 34 so that the tips 36 abut to define the circular head 36′ which will pass through the hole 52. The female clip 24 may then be mounted on the stem 30 by pressing the bight 48 against the beveled edges of the tips 36 to compress them so that the round head 36′ passes through the hole 50 in the bight 48. When the tips 35 pass fully through the hole 50 bifurcations 34 expand fully in a direction transverse to the length of the clip 24 as shown in FIG. 2. There the flat, annular shoulders 40 engage at the inner curved side 49 of the bight 48. This locks the clip structure 20 in place.

Figure 11:
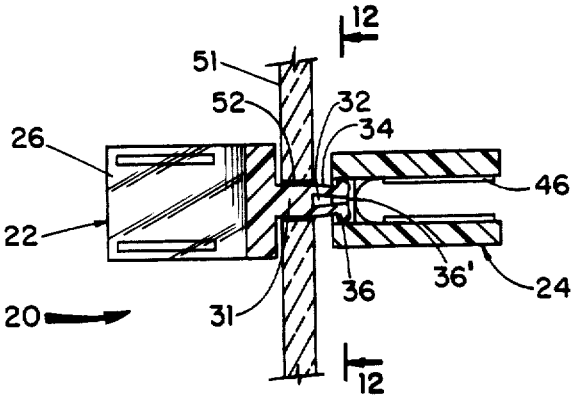
FIG. 11 is a vertical cross sectional view similar to FIG. 3 showing the female clip in partial engagement on the male clip.
Figure 12:
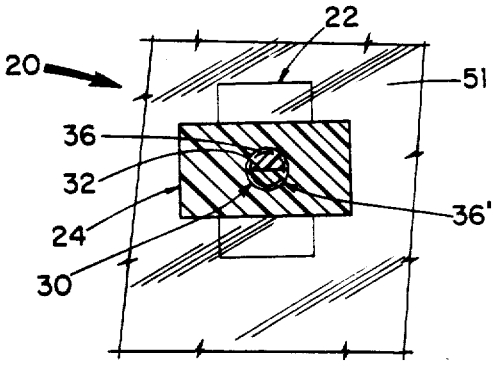
FIG. 12 is an enlarged vertical sectional view taken along line 12—12 of FIG. 11.

To detach the clips from each other and from the panel 51, the clip 24 may be used as a tool. The space between the side walls 44 of the clip 24 is substantially less than the diameter of the tips 36. Thus, by rotating the clip 24, so that the planes of the side walls 44 are perpendicular to the sides 36 of the clip 22, [as illustrated in FIGS. 11 and 12] the tips 36 are pressed together by the walls 44 and the stem 30 may easily be pulled out of holes 50 and 52 in the bight 48 and the panel 51 respectively.

Figure 6A:
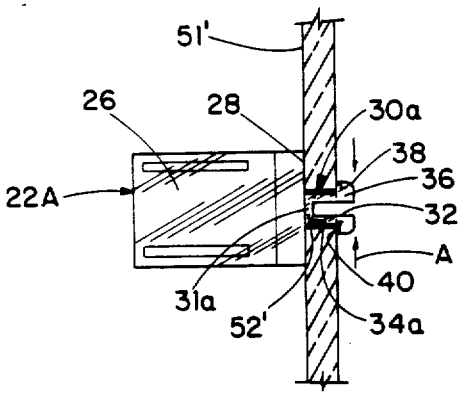
FIG. 6A is a top plan view of the clip of FIG. 5A shown engaged on a mounting panel.
Figure 5A:
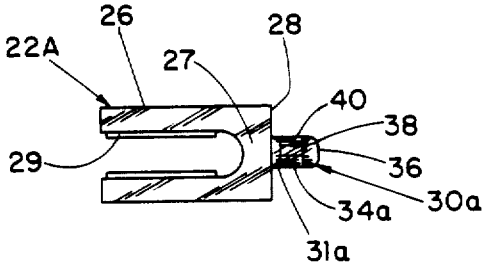
FIG. 5A is a side view similar to FIG. 5 of another male clip.
Figure 10:
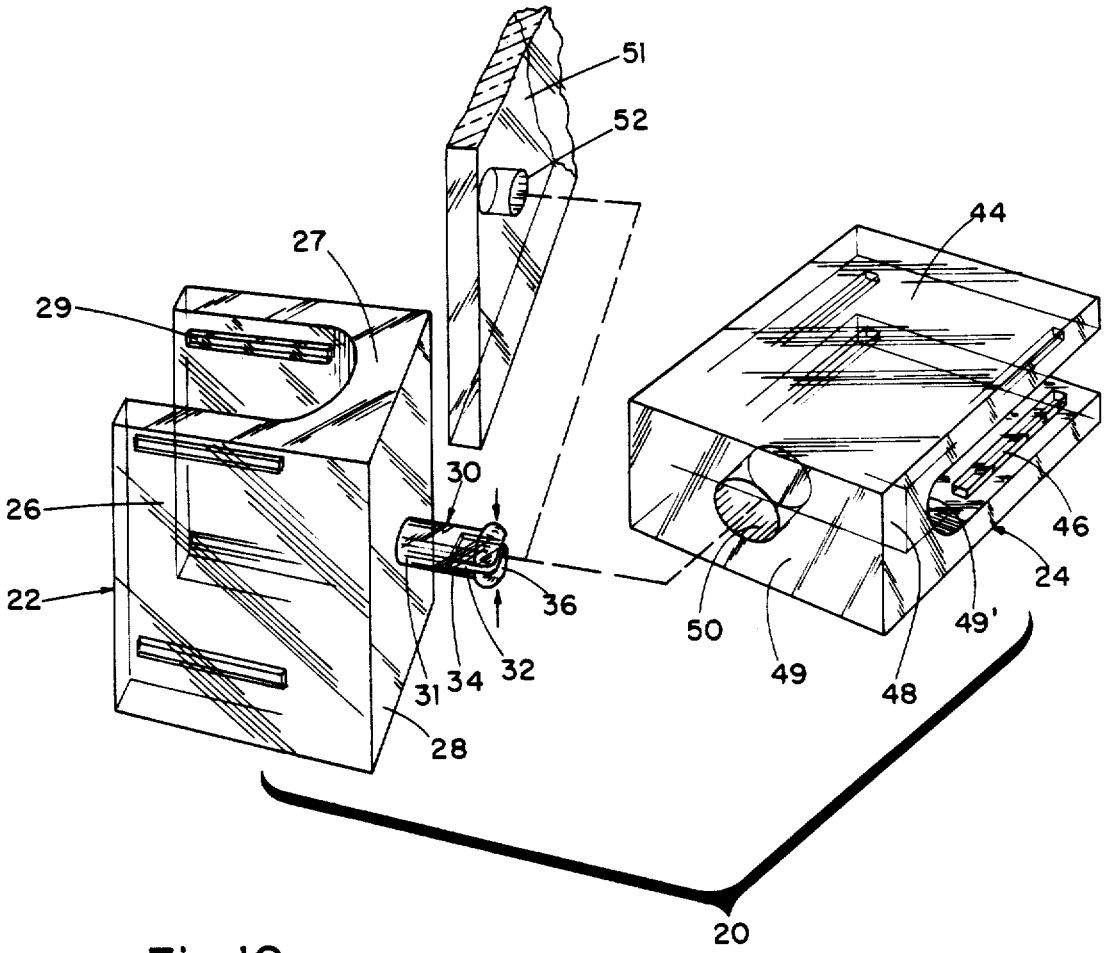
FIG. 10 is an enlarged exploded perspective view of parts of the bracket assembly of FIG. 1.

FIGS. 5A and 6A illustrate another clip 22A which is similar to the clip 22 with corresponding parts identically numbered. A stem 30a is shorter than the stem 30. A neck 31a has an axial length substantially equal to the thickness of a support panel 51′. It will be noted that the flat annular shoulder 40 of the tips 36 abut and lock against the outside of the panel around a hole 52′. To engage the clip 22A on the panel 51′ it is simply necessary to push the stem 30a axially to compress flexible bifurcations 34a so that the round tips 36 of the stem 34a can pass through the hole 52′. To remove the clip, the tips 36 must be pressed together as indicated by arrows A, by means of the female clip 24. That is, the clip 24 is pressed against the tips 36 so that the tips 36 are in the hole 50 whereby the tips 36 are compressed to substantially the same diameter as the hole 52′. Then the stem 30a may be easily withdrawn through the hole 52′.

The clips 22, 22A, and 24 may be oriented horizontally to support horizontal shelves on the support panel 51 or 51′ or alternatively they may be turned vertically or diagonally to support vertical partitions or diagonal shelves respectively. If desired, the hole 50 in the bight 48 of the female clip 24 may be tapered outwardly from the curved inner wall 49′.

The clips can be used in multiples to assemble display case, display panels, room partitions and dividers for office or home furniture, book cases, and the like. They can be economically produced by mass production methods and machinery. They are strong, durable, and will provide long, troublefree service. They do not need auxillary fasteners such as screws which is highly advantageous.

It should be understood that the foregoing relates to only a preferred embodiment of the invention which has been by way of example only, and that it is intended to cover all changes and modifications of the examples of the invention herein chosen for the purposes of the disclosure, which do not constitute departures from the spirit and scope of the invention.

What is claimed is:

1. A bracket structure for supporting horizontal or vertical sheet-like members and adapted for attachment to a supporting apertured panel, comprising:

a clip having a U-shaped body, said body having two opposing, spaced flat side walls joined by an integral end wall;

[said side walls having ridges integrally formed on inner opposing sides of said side walls for frictionally engaging one of said sheet-like members; and]

a stem extending outwardly of an outer side of said end wall, said stem having a cylindrical neck with a diametrical slot extending from a point intermediate the end of said stem and the outer side of said end wall to the end of said stem to define two flexible parallel spaced bifurcations, each having equal cross-sectional areas throughout their respective extents and each bifurcation terminating in a tip having a larger radius than that of said neck, both of said tips when abutted defining a head adapted to pass through an aperture in said supporting apertured panel.

2. A bracket structure as defined in claim 1, wherein said tips are formed with shoulders which engage around a rim of said aperture at one side of said panel to prevent said stem from passing through said aperture when said bifurcations are in spaced unflexed position.

3. A bracket structure as defined in claim 2, wherein the axial length between said outer side of said end wall and said shoulders of said neck is substantially equal to the thickness of said panel so that said stem is snugly engaged and supported by said panel while said outer side of said end wall abuts the other said of said panel.

4. A bracket structure as defined in claim 2, further comprising:

another clip having another U-shaped body, said other body having other opposing, spaced, flat side walls for receiving another one of said sheet-like members therebetween;

said other flat side walls being joined by an integral other end wall;

said other end wall having a hole adapted to receive said stem of said first named clip, said hole being substantially equal in diameter to that of said head when said bifurcations are compressed to permit said head to pass through said hole in said other end wall, whereby said shoulders on said tips engage an inner side of said other end wall when said bifurcations are in spaced, unflexed condition.

5. A bracket structure as defined in claim 4, wherein the axial length between said outer side of said end wall and said shoulders of said neck is substantially equal in axial length to the thickness of said panel and the thickness said other end wall, so that said panel and said other end wall are snugly engaged by said stem between said end wall of the first named clip and said tips of said stem, when said neck extends through said aperture in said panel and said hole in said other end wall.

6. A bracket structure as defined in claim 4, further comprising other ridges integrally formed on inner opposing sides of said other side walls for frictionally engaging said other sheet-like member.

7. A bracket structure as defined in claim 4, wherein the spacing of said other side walls of said other clip is less than the diameter of said tip of said stem of said first clip so that turning said other clip so that said side walls of said other clip are in a mutually perpendicular position to the side walls of said clip thereby compresses said spaced bifurcations of said clip and caused said tips to abut together and define said head which can then pass through said hole in said other end wall and through said aperture in said panel to fully disengage said first named clip from said panel and said other clip.

8. A bracket structure as defined in claim 7, wherein said end wall of said first named clip and said other end wall of said other clip have flat outer sides to abut flush against opposite sides of said panel when engaged between said clips.

9. A bracket structure as defined in claim 7, wherein said aperture in said panel and said hole in said end wall of said other clip are both circular and of substantially equal diameter, said tips of said stem being semicircular and defining a circular head when said bifurcations are compressed, the diameter of said circular head being substantially equal to the diameter of both said aperature and said other hole.

10. A clip structure as defined in claim 4, wherein said tips of said stem have beveled forward edges opposite from said shoulders to aid in compressing said bifurcations and facilitate entry of said stem through said aperature in said panel and said hole in said other end wall.

*11. A bracket structure as defined in claim 1, wherein said side walls have ridges integrally formed on inner opposing sides of said side walls for frictionally engaging one of said sheet-like members.*

* * * * *